July 16, 1935.                 J. B. MARIS                2,008,363
                          AQUARIUM AIR SUPPLY
                          Filed May 19, 1934
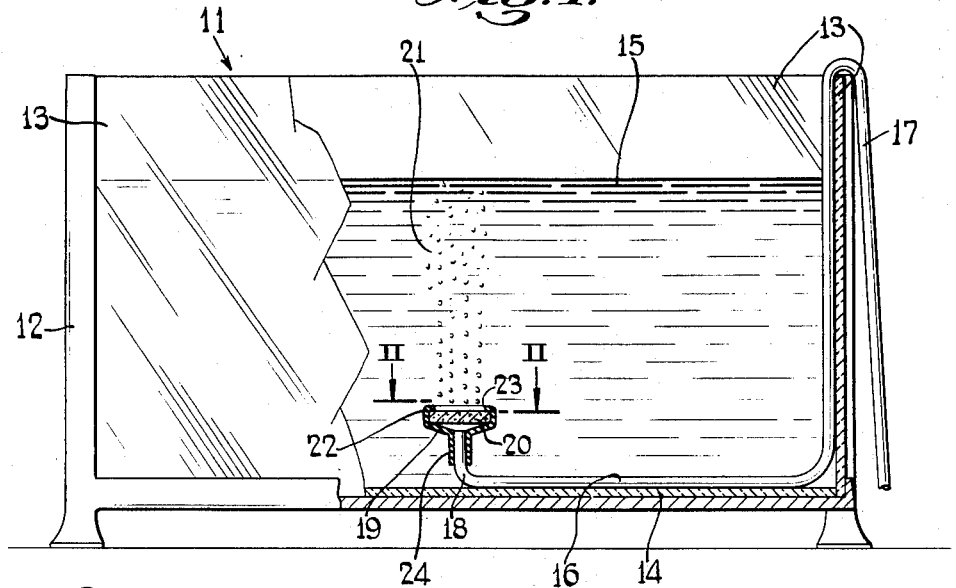
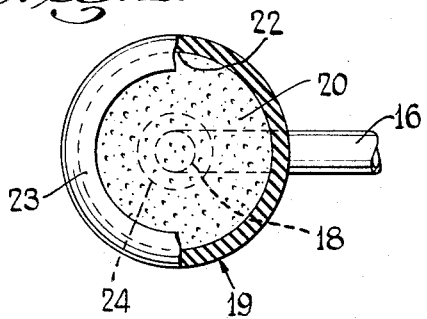
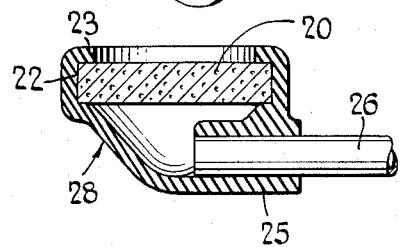
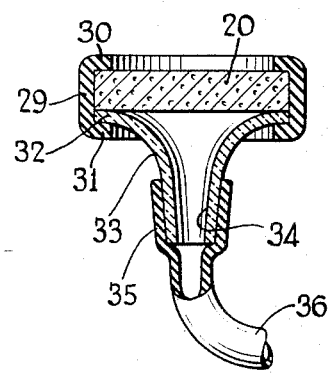
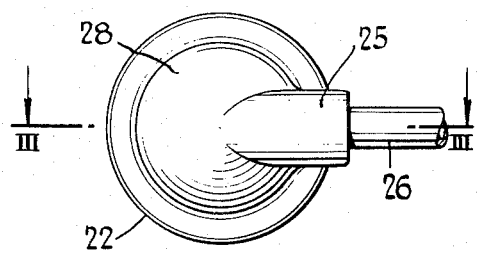
INVENTOR
James B. Maris
BY
Lyman E. Dodge
ATTORNEY Patented July 16, 1935

2,008,363

UNITED STATES PATENT OFFICE 2,008,363

AQUARIUM AIR SUPPLY

James B. Maris, Glen Ridge, N. J.

Application May 19, 1934, Serial No. 726,438

4 Claims. (Cl. 261—121)

This invention relates to aquaria, especially of the household type, and relates more particularly to means for aerating the water of aquaria.

A general object of the invention is to provide an improved aquarium aerating means of sturdy, compact and simple construction, which can be easily installed interchangeably in any of a variety of conventional or other type of aquaria without special skill, and can be removed with equal ease for inspection, adjustment, repair and replacement.

Another object of this invention is to provide such an aquarium aerating device with an air-delivery means which will deliver the air in a stream of extremely small bubbles spaced suitably for efficient aeration, and which delivery means is of a material not affected deleteriously by the aquarium water, and which can be easily cleansed from time to time.

Another object of the invention is to provide, as part of the aerating device structure, a support for the aerating means of such a character that the aerating means may be readily removed from the device and returned thereto, or replaced by a substitute aerating means, without displacing or disturbing the device as a whole.

Still another object is to provide such an aerating device of attractive appearance and which lends itself readily to various artistic combinations with other articles within the aquarium, such as pebbles, miniature figures, buildings, and plants, according to the taste of the individual user, and which can be so adjusted as to localize at any preferred region of the aquarium, an upward current that tends to creat subsidiary currents, drawing in such objects as balls and submerged figures and propelling them upward, thereby imparting a pleasing effect of animation to the aquarium ensemble.

Other objects and advantages will appear as the description of the particular physical embodiment selected to illustrate the invention progresses, and the novel features will be particularly pointed out in the appended claims.

In describing the invention in detail, and the particular physical embodiment selected to illustrate the invention, reference is had to the accompanying drawing, and the several views thereon, in which like characters of reference are used to designate like parts throughout the several views, and in which:

Figure 1 is a view in front elevation, and partly in vertical section of an aquarium, with an aerating device in the construction of which my invention has been embodied; Fig. 2 is a fragmentary, detail view in plan, partly in horizontal section, of a delivery means and its support of the type illustrated in Fig. 1, taken separately, and on a larger scale; Fig. 3 is a vertical sectional view, taken on the plane indicated by the line III—III of Fig. 4, and viewed in the direction of the arrows at the ends of the line, illustrating a modification of the delivery means; Fig. 4 is a view in bottom plan of the modified form of delivery means shown in Fig. 3 with a fragment of conduit attached; Fig. 5 is a view in vertical section of another modification of the delivery means, with an attached conduit shown partly in section and partly in elevation.

In the illustrative embodiment of the invention shown in the drawing, referring more particularly to Figs. 1 and 2, the reference character 11 designates generally an aquarium of the household type with a frame 12, and glass walls 13 and bottom 14 containing the aquarium water 15.

At 16 is shown a conduit, preferably formed of celluloid, hard rubber or a metal that is not subject to corrosion and which can be readily bent to conform to the dimension of the aquarium structure to which it is to be applied, and which derives a supply of air under pressure from any suitable source (not shown).

In Fig. 1 the conduit has an upward bend 17 in the shape of an inverted U, to conform to the wall 13, by which it is supported in upright position, and the part 16 lies along the bottom of the aquarium, with a terminal upward bend 18 positioned near the center of the aquarium, although this position may be varied at will, according to the taste of the user, and the position of the conventional or other contents of such an aquarium.

In pursuance of the invention, an air-delivery means is shown at 20, comprising a disc of suitably porous material, fitted in, and supported by a socket 19 which is mounted on the terminal 18 of the conduit, and thereby maintained upright in position, with the disc 20 preferably parallel with the surface of the water, so that the stream of air will rise, as shown at 21, in spaced bubbles.

The disc 20 may desirably be formed of a non-organic material, such as alundum, carborundum or baked clay, as any of these materials are readily obtainable in disc form and are durable, not frangible under ordinary conditions of use, and are not subject to inordinate fouling, but may be easily cleaned, either in place, or upon removal.

In further pursuance of the invention, provision is made for supporting the disc 20 in such a manner that it can be readily removed from its supporting structure for inspection, cleaning and replacement, and to this end the socket 19 is made of an elastic material, such as rubber, so moulded as to embrace yieldingly at 22 the periphery of the disc 20, in the manner shown, the disc being easily removed manually by pressing aside the lip 23 and extracting the disc.

This may be done without disturbing the conduit 16, or removing the socket 19 therefrom, as the socket is held in place upon the conduit terminal 18 by a neck 24 which is of suitable dimensions to fit snugly and resist casual displacement.

Variations in the structure of the support may be made as found desirable. For example, where it is desirable to have the delivery means supported nearer the bottom of an aquarium, or near to any wall thereof, the modification shown in Figs. 3 and 4 may be utilized, the socket 28 there shown having a hollow boss 25 with a laterally extending mouth to receive the terminal 26 of the air conduit. The part 22 of the socket embracing the disc 20, and the retaining lip 23, are like those already shown and described with reference to Figs. 1 and 2 and bear like reference characters.

In Fig. 5 another modification is illustrated in which the disc 20 is embraced by a ring 29 of elastic material with retaining lips 30 and 31 respectively above and below the lateral margins of the disc, and the lower lip 31 embraces also the flaring margin 32 of the funnel shaped supporting neck-piece 33, with a terminal 34 fitted in the terminal 35 of the air conduit 36.

The neck-piece 33 in this instance may desirably be formed of non-porous material, such as metal, or of a vitreous substance, such as glass, or of such material as celluloid.

It will be seen from the foregoing disclosure that the aquarium aerating device forming the subject of this application can be readily installed by any person of average mechanical skill, and that the delivery means can be positioned anywhere within the aquarium, either upon the bottom or upon any wall.

It delivers the air in a stream of bubbles, aerating the water thoroughly, and causes a current of water to flow from it, and other currents to approach it, thereby imparting an animated effect to the weed usually provided in such an aquarium and to any floating or submerged objects which may be contained therein.

The disc 20 can be easily cleaned in place, or removed in the manner described for inspection, cleaning and replacement.

Although I have particularly described one particular physical embodiment of my invention and explained the operation, construction and principle thereof, nevertheless I desire to have it understood that the form selected is merely illustrative, but does not exhaust the possible physical embodiments of the idea of means underlying my invention.

What I claim as new and desire to secure by Letters Patent of the United States, is:

1. An aquarium aerating device, comprising in combination: an air conduit of yielding material adapted to be conformed manually to an aquarium wall structure and having a terminal to be positioned in self-sustaining upright position in any desired location within said aquarium, said terminal forming with said conduit a unitary structure readily adjustable within said aquarium, and readily removable therefrom; and an air delivery means having a part to be fitted to, and movable with, said terminal, a part formed of flexible material, and a part formed of porous material, embraced peripherally by a yielding portion of said flexible part, and supported in upright position thereby, being readily removable from said embracing portion by manual stretching of said embracing portion, while said air-delivery means remains in place.

2. An air delivery means for an aquarium aerating device of the class having an air delivery conduit of the type set forth in claim 1, said air delivery means being characterized by a disc of relatively rigid porous material, and a supporting socket formed of elastic material adapted to serve as a disc-embracing annulus being provided with upper and lower annular lips, and a separately formed funnel-shaped neck-piece adapted to have its small end fitted to said conduit, and adapted to have its flaring end fitted within said lower annular lip of said socket, in juxtaposition with said disc.

3. An air delivery means for an aquarium aerating device of the class having an air delivery conduit, said air delivery means being characterized by a disc of relatively rigid porous material and a supporting socket consisting of a one-piece structure of elastic material formed with a disc embracing rim and lip, and with an integral neck to be fitted to said conduit, said neck having a hollow boss with a mouth opening laterally therefrom to receive said conduit terminal, said boss being of substantial thickness and adapted to have its bottom disposed upon the bottom of an aquarium tank so that said disc is supported in an upright position exposed for delivery of a stream of air bubbles directly upwardly therefrom.

4. Means for aerating an aquarium tank comprising, in combination, and an aerating device including an air conduit formed of resistently yielding material having an inverted U-shaped portion extended over a side wall of said tank and having a terminal portion adapted to extend therefrom to a selected central region adjacent to and in which said terminal is supported by the bottom of said tank, the position of said terminal being determinable by bending said conduit portions; said aerating device being further characterized by a separately formed air delivery means having a neck adapted to fit said conduit terminal, a disc of relatively rigid porous material, and a socket of elastic material formed with a disc-embracing rim and having a portion connected with said neck, whereby said delivery means are adapted to be presented in self-sustaining upright position with said disc suitably disposed to deliver the supply of air in an unobstructed upward stream, and said disc being also readily displaceable and replaceable manually by manipulation of said elastic rim while the socket remains in place upon said terminal.

JAMES B. MARIS.

CERTIFICATE OF CORRECTION

Patent No. 2,003,363.  July 16, 1935.

JAMES B. MARIS.

It is hereby certified that error appears in the printed specification of the above numbered patent requiring correction as follows: Page 2, second column, line 45, claim 4, strike out the word "and"; and that the said Letters Patent should be read with this correction therein that the same may conform to the record of the case in the Patent Office.

Signed and sealed this 17th day of September, A. D. 1935.

Leslie Frazer (Seal)  Acting Commissioner of Patents.